United States Patent [19]

Schmitz

[11] Patent Number: 5,034,837
[45] Date of Patent: Jul. 23, 1991

[54] MAGNETIC DISK DRIVE INCORPORATING A MAGNETIC ACTUATOR LOCK AND A VERY SMALL FORM FACTOR

[75] Inventor: Brian Schmitz, Pompano Beach, Fla.
[73] Assignee: Rodime PLC, United Kingdom
[21] Appl. No.: 433,616
[22] Filed: Nov. 9, 1989
[51] Int. Cl.⁵ .................. G11B 5/54; G11B 21/22
[52] U.S. Cl. .................................. 360/105; 360/106
[58] Field of Search .................. 360/99.12, 105, 106

[56] References Cited

U.S. PATENT DOCUMENTS

| | | | |
|---|---|---|---|
| 4,581,667 | 4/1986 | Garfast | 360/99.12 |
| 4,692,829 | 9/1987 | Campbell | 360/105 |
| 4,710,834 | 12/1987 | Brand et al. | 360/105 |
| 4,764,831 | 8/1988 | Patel | 360/105 |
| 4,881,139 | 11/1989 | Hazebrouck | 360/105 |
| 4,903,157 | 2/1990 | Malek | 360/105 |

Primary Examiner—A. J. Heinz
Assistant Examiner—Jefferson Evans
Attorney, Agent, or Firm—Mason, Fenwick & Lawrence

[57] ABSTRACT

The invention provides a magneticf actuator lock for the head positioning actuator of a disk drive. The magnetic actuator lock comprises a magnet, and first and second stop means, one of which is attached to the head positioning actuator. The stop means constitute a low reluctance pathway for magnetic flux, thus attracting and "latching" the two stop means together. This magnetic actuator lock does not require an additional permanent magnet but may use the magnetic force of the permanent magnet in a voice coil motor.

24 Claims, 9 Drawing Sheets

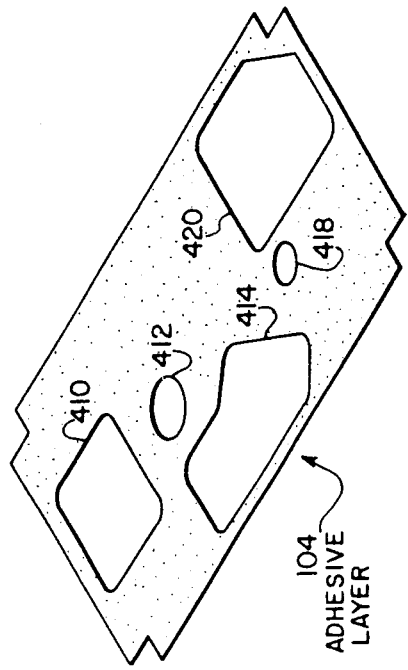
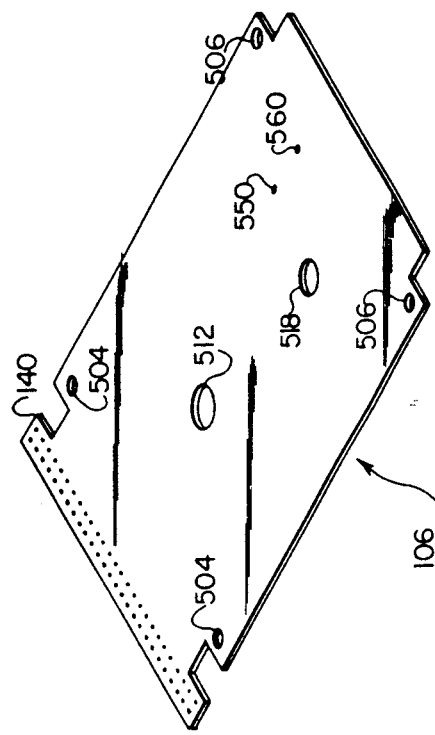
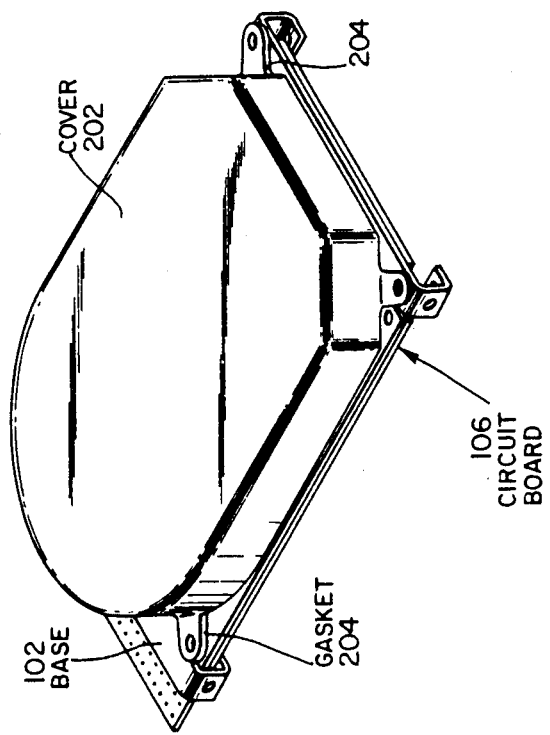
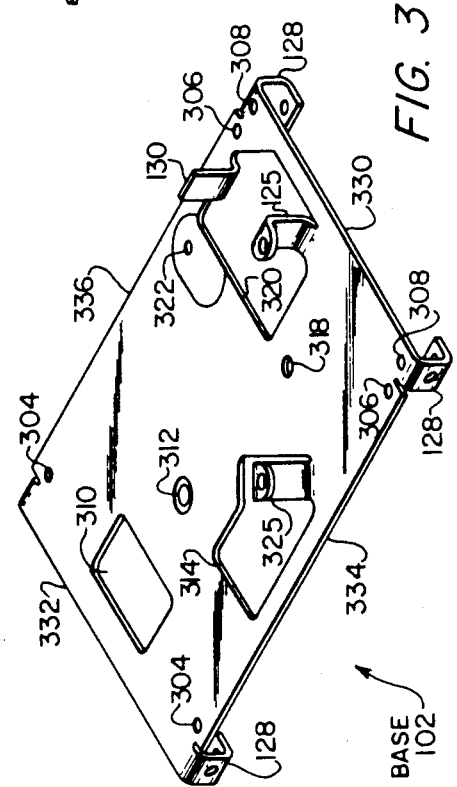

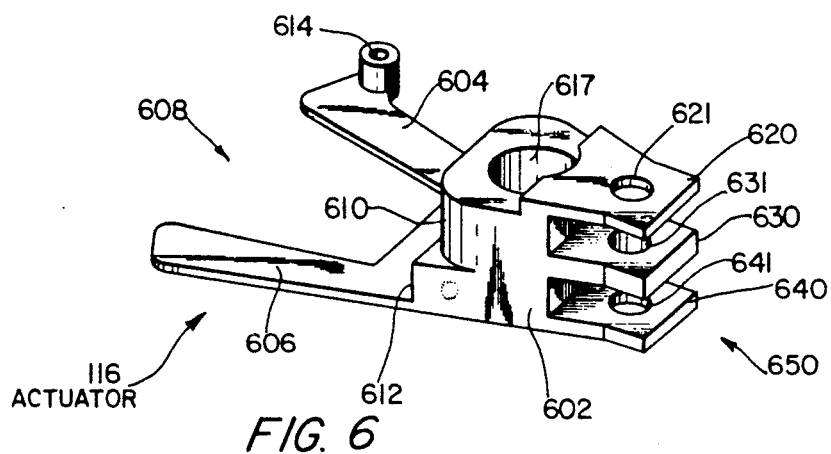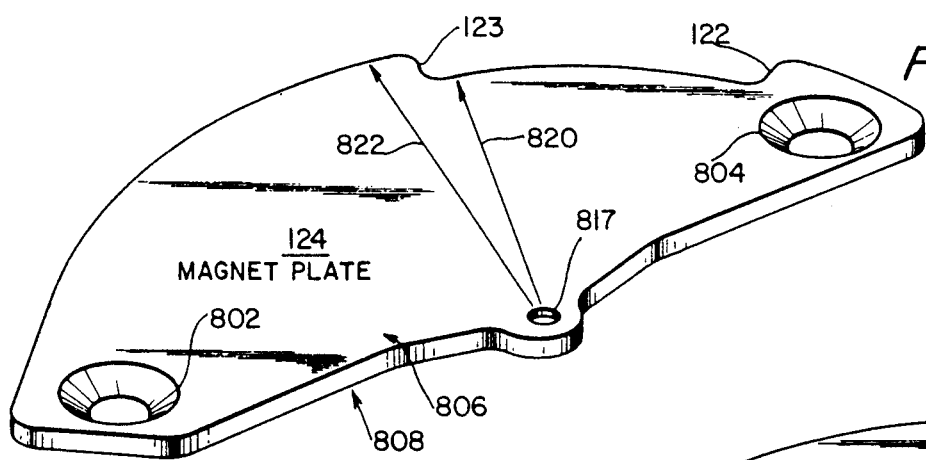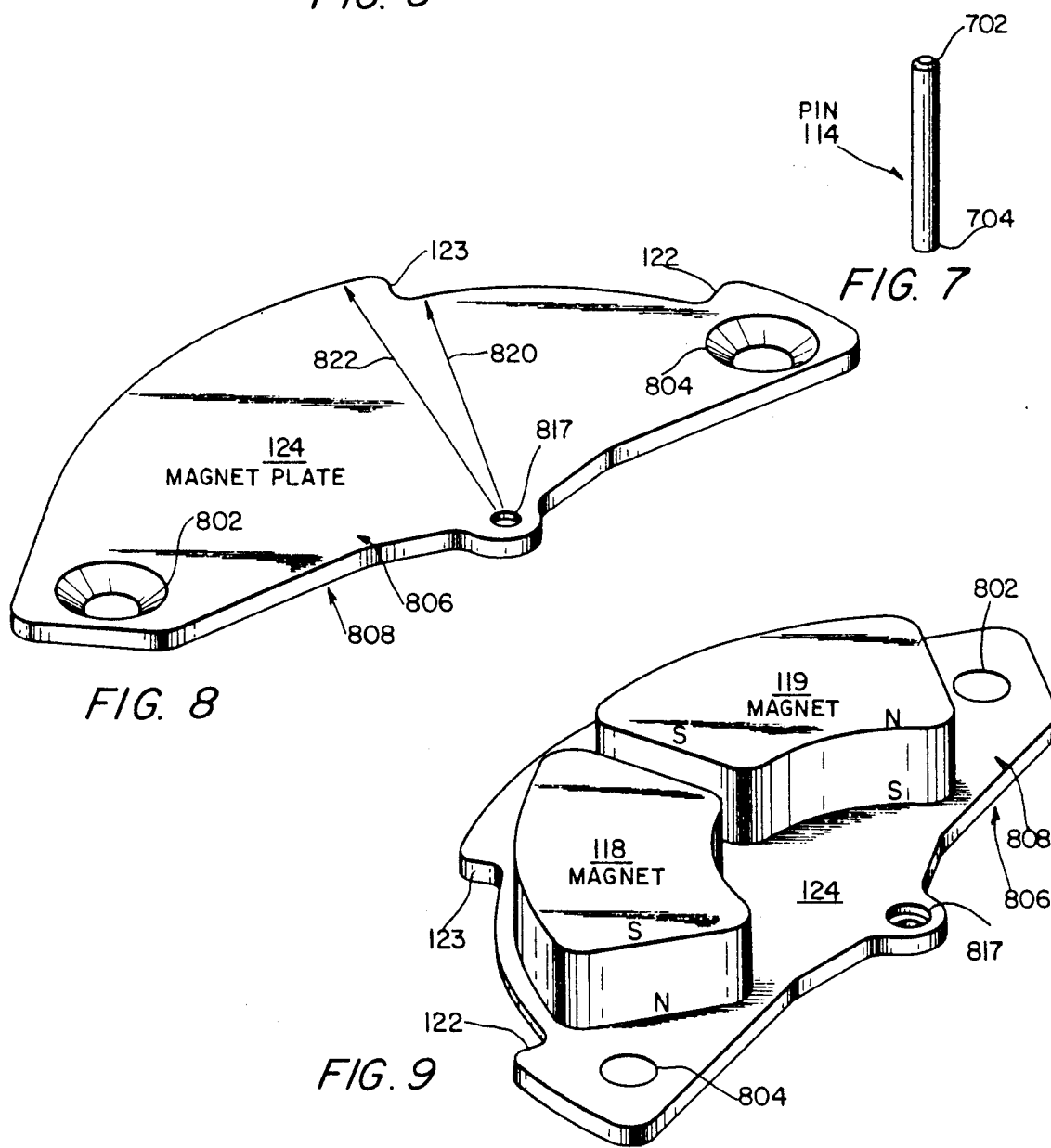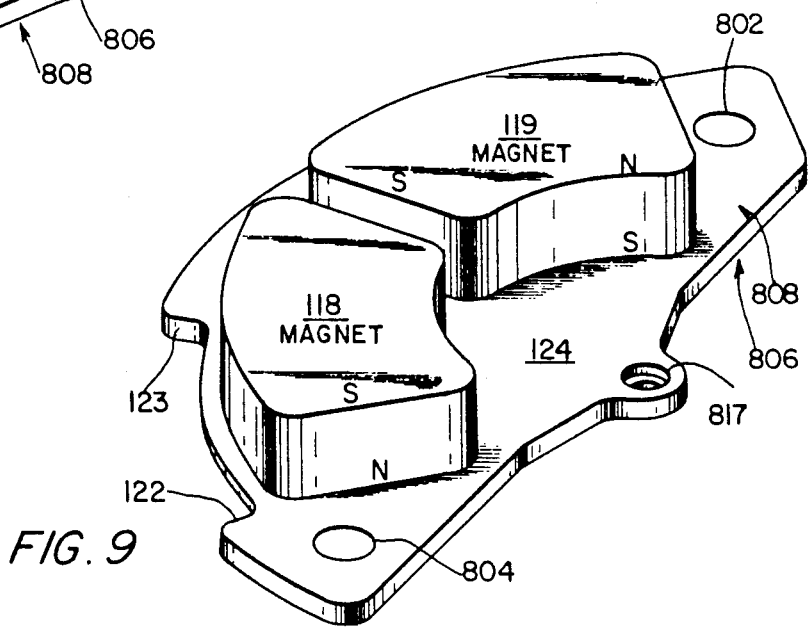

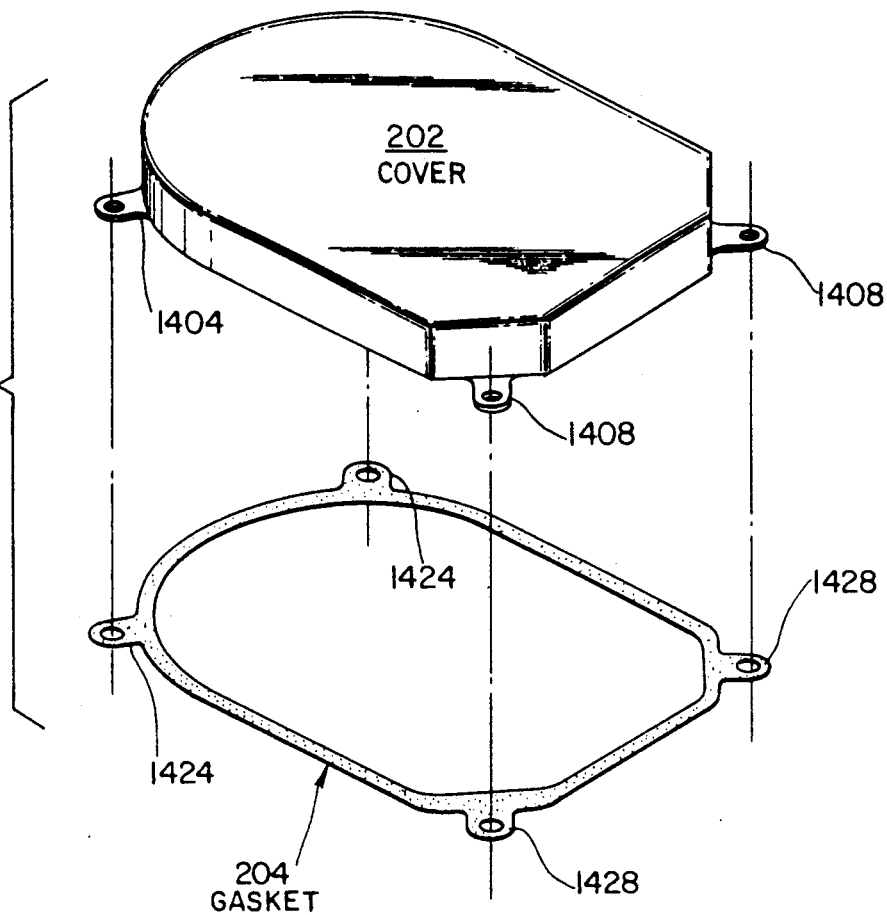
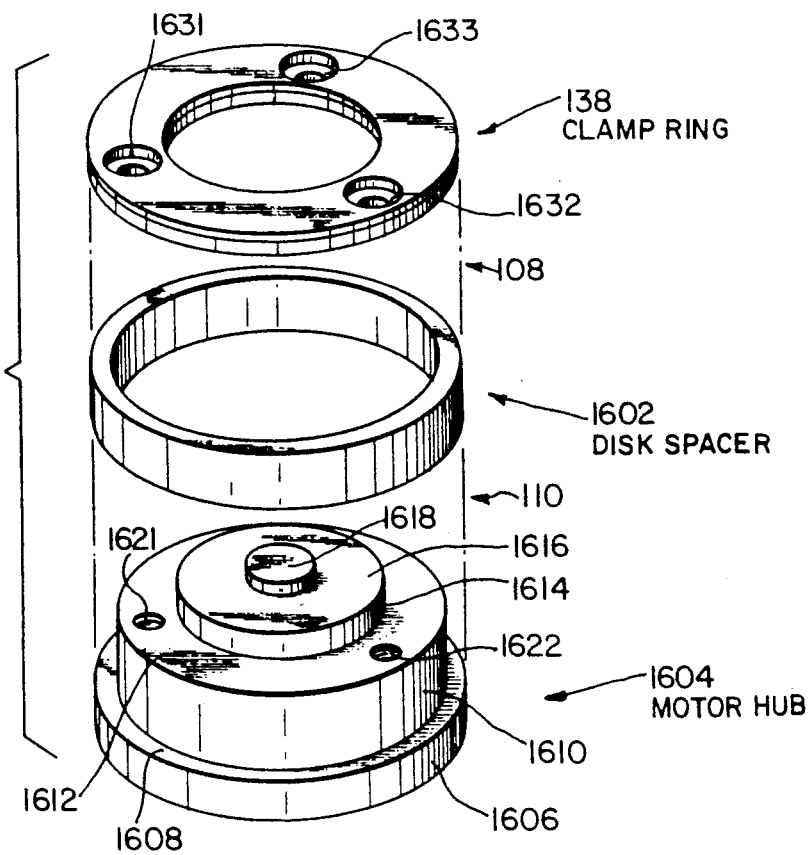

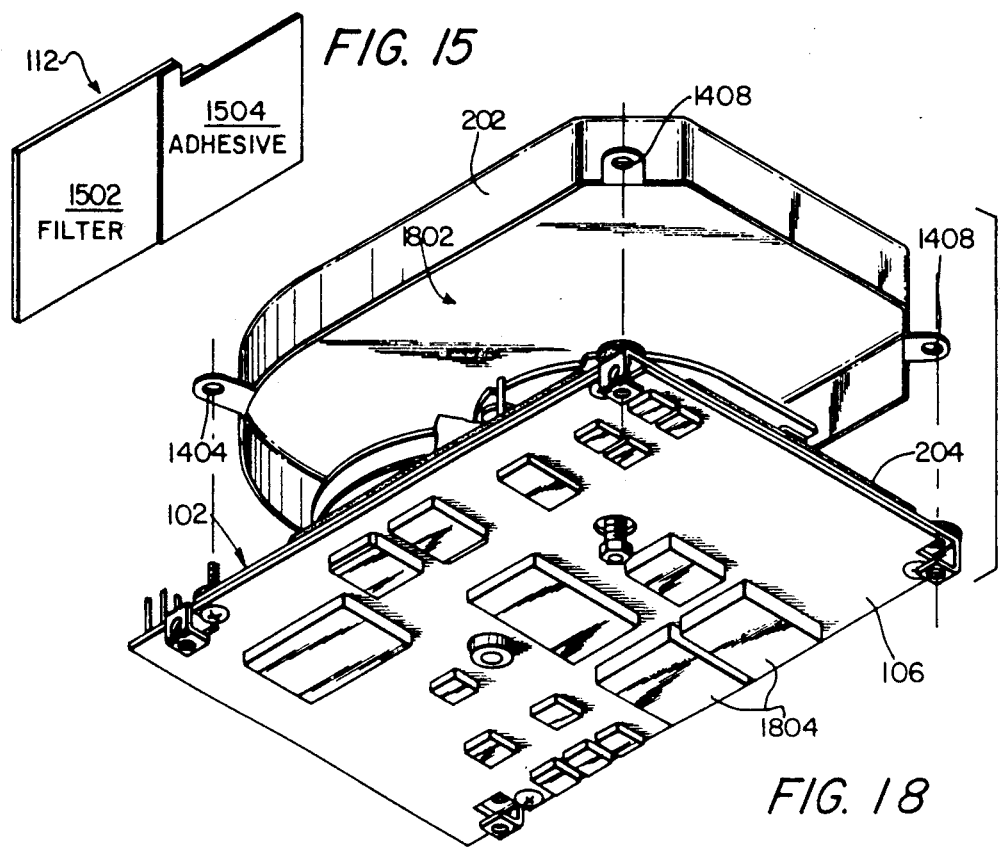
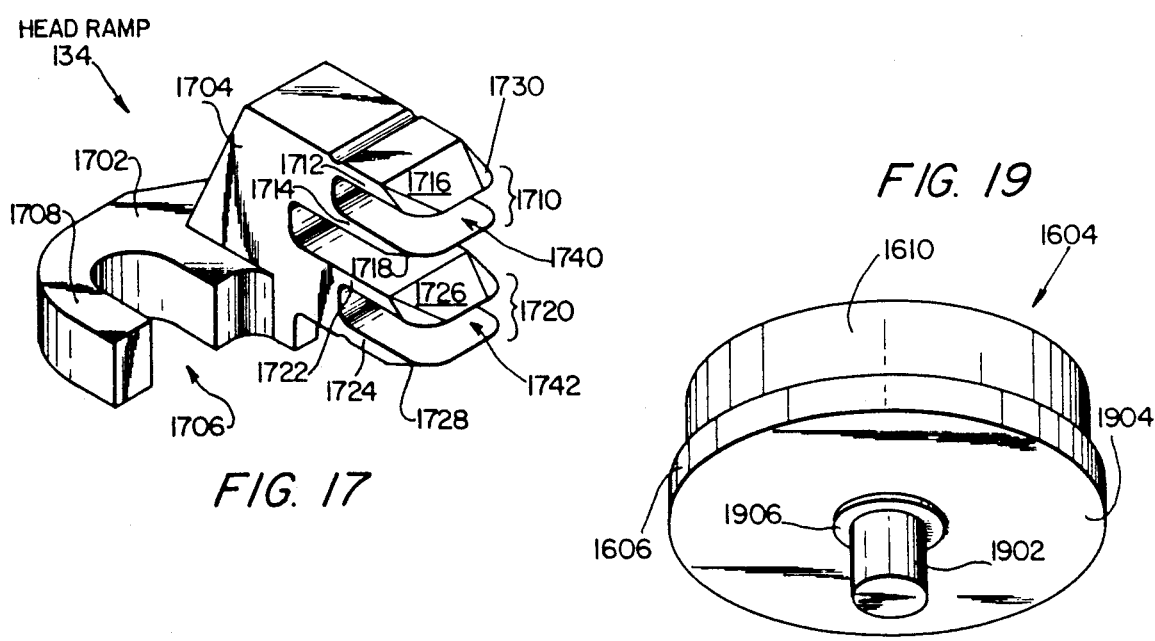

MAGNETIC DISK DRIVE INCORPORATING A MAGNETIC ACTUATOR LOCK AND A VERY SMALL FORM FACTOR

CROSS REFERENCE TO RELATED APPLICATION

The present patent application is related to U.S. patent application Ser. No. 07/433,615, filed concurrently herewith, which is incorporated by reference herein as if reproduced in full below.

BACKGROUND OF THE INVENTION

1. Field of the Invention

The present invention relates to magnetic disk drives. The invention relates to a magnetic actuator lock which does not require the use of separate permanent magnets or electromagnets but uses the drive's own voice coil motor magnets to provide attracting forces. The invention also combines advantageous features in a very small form factor made possible by a novel mechanical and electronics design.

2. Related Art

A disadvantageous feature of disk drives that is well known in the art today is the problem of head/disk 'crashes'. In fact, the word 'crash', although generally used, is somewhat misleading, in that read/write heads rarely crash on to the disk surface during normal operation of the drive when the head is flying in a stable mode. The problem refers more often to the aftereffects of the head sitting on the disk surface after the drive has been powered down. The vast majority of known disk drives operate in the mode where the head takes off and lands on the disk, usually in a so-called 'parking and landing' zone. Depending on surface characteristics of the disk and head, the head may adhere to the disk and fail to take off correctly (stiction problem), or the surface of the head may become contaminated by material (e.g. lubricant) from the disk causing the head to fly at an unstable altitude, thus degrading performance and perhaps leading to a catastrophic failure.

Prevention of this 'crash' or 'stiction' phenomenon depends largely on strict control of the disk surface quality and of the chemistry, consistency and deposition of surface lubricant. This is difficult and expensive process for the typical disk drive, and failure to maintain standards can have repercussions at a later date. However, even if the surface quality is maintained, problems may still arise between head and disk as a result of rough handling, during movement of the drive after power down. Rough handling may cause damage to the head, disk or both. In this the latter case, the impact may be minimized if the heads have been parked in the parking zone, where no customer data is written. Generally, current disk drives either implement a park command or can sense that a power down is occurring and automatically move the heads to the parking zone.

Another approach, known in the art, to solving these head disk problems is to design the drive in such a way that the heads are physically removed from the disk surfaces at switch-off or by specific command. This has generally been done by moving the heads both vertically away from the surfaces and laterally away from the edge of the disks. This technique was a necessary and common practice in the earlier days of the disk drive industry, when disk cartridges were much in use, and before the development of the modern lightly-loaded head and lubricated disk. Again however, the techniques used for this technique are complicated, difficult to set up and normally make use of solenoids and lifting devices. U.S. Pat. No. 4,661,873 shows such a device. It involves many separate elements, such as springs, pins, arms, solenoid, magnetic shields, etc.

For all the above reasons, it is desirable to provide a disk actuator parking system which removes the heads from the disk surfaces, either on command or at power-off, with minimum complexity and number of components.

A further disadvantageous feature of disk drives at the present time is the method used to lock the actuator, which supports the read/write heads, whether in the landing zone or on a head ramp.

Generally known methods used to lock the actuator in either the landing zone or on the ramp can be broadly classified into two groups. The first group consists of methods that use electromagnetic solenoids to move a locking pin, arm or other feature which mechanically prevents the actuator from moving once power is applied to the solenoid. This method has numerous disadvantages, including the power consumption required to keep the solenoid energized while the drive is operating. This method also adds considerable cost to the disk drive because of the solenoid itself as well as the electronic circuits required to operate the solenoid.

A second widely known method used to latch the actuator in the correct position typically employs a permanent magnet and a magnetically permeable material such as steel to hold the actuator in position by magnetic attraction. This method has the disadvantage that it requires a separate permanent magnet to provide the attractive force in addition to the permanent magnets commonly used for the voice coil motor. This increases the drive cost and complexity.

Therefore, it is desirable to provide a method for locking the actuator in the correct zone which does not require the use of an electromagnetic solenoid or a separate permanent magnet.

The features of low acoustic noise, damping and simplicity of head parking are especially desirable in disk drives subject to portable applications. Portability itself has its own requirements and objectives. In the computer world, specific designs for portability began in the early 1980's with personal computers weighing around 30 lbs. and supplied with carrying handles. These were more accurately described as 'luggable' rather than 'transportable'. This style of portable computer has since evolved into second generation 'laptop' machines, weighing and measuring considerably less. In parallel with these size-reduction trends in the computer world, the rigid disk drive industry has witnessed its own miniaturization over the last twenty years, from approximate disk diameters of 28" in the 1960's, to 14" and 8" in the 1970's, to 5.25" and 3.5" in the 1980's. These trends in disk drive form factors have been matched by complementary improvements in data storage densities, performance, power requirements and price. The increasing sophistication, availability and universality of popular software during the last few years has fueled the requirement for versatile, high-performance personal computers and driven the hardware developments in the industry. Taking all of those trends together, the growing demand for laptop computers requires a matching availability of small, light-weight, high-performance hard disk drives with data storage capability equivalent to that obtained on drives designed for desktop computers.

There is a demand, therefore, for a small disk drive with typically 40 Megabyte storage capacity suitable for use in very small computer systems, such as laptops, or other systems requiring off-line memory, and with the associated features of quietness, ruggedness and high performance.

SUMMARY OF THE INVENTION

The invention also provides an actuator lock which does not require the use of a solenoid or a separate permanent magnet, but uses permanent magnets associated with the voice coil motor to provide attractive force necessary to hold the heads in the correct zone. This invention reduces the drive cost and complexity.

The invention also provides a magnetic disk drive in a very small size, enabled through a novel mechanical and electronics design.

Other features and advantages of the present invention will become apparent to those skilled in the art upon reading the following Detailed Description of the Preferred Embodiments.

BRIEF DESCRIPTION OF THE DRAWINGS

The invention is better understood by reading the following Detailed Description of the Preferred Embodiments in conjunction with the accompanying drawings, in which like reference numerals refer to like elements throughout, and in which:

FIG. 2 is a perspective view of the disk drive apparatus, with the cover and gasket to show the small form factor achievable;

FIG. 3 is a perspective view of the base on the preferred embodiment of FIG. 1, on which are mounted many of the elements of the disk drive;

FIG. 4 is a perspective view of an acrylic adhesive layer used to join the base to a circuit board so as to reduce acoustic noises and damp the components' resonances;

FIG. 5 is a perspective view of a printed circuit board which is bound to the underside of the base (FIG. 3) by means of an adhesive layer (FIG. 4), the assembly thereby reducing acoustic noise and providing damping of the resonances associated with mechanical components of the disk drive in the preferred embodiment of the present invention;

FIG. 6 is a perspective view of the head positioning actuator 116 according to the preferred embodiment of the present invention;

FIG. 7 is a view of the stop pin 114 which is attached to the head positioning actuator so as to limit the range of motion of the actuator;

FIG. 8 is perspective view of a magnet plate seen with a circumferential notch contoured in it which serves to limit motion of head positioning actuator;

FIG. 9 is an illustration of a magnet assembly including the magnet plate (FIG. 8) further illustrating the magnets used in the preferred embodiment of the present invention;

FIG. 14 illustrates the cover for the disk drive assembly with its associated gasket for insertion between the base and the cover;

FIG. 15 illustrates a preferred air particle filter for use in the disk drive assembly according to the preferred embodiment;

FIG. 16 illustrates the spindle motor hub, with disk spacer and clamping ring at the center of rotation of the disks;

FIG. 17 illustrates in perspective view a preferred head ramp for holding the head assembly away from the disks when or near the 'parked' position;

FIG. 18 is a bottom perspective exploded view of the cover 202, base 102 and circuit board 106 (on which are illustrated exemplary integrated circuit chips);

FIG. 19 is a bottom perspective view of the spindle motor hub 1604 (FIG. 16.);

DETAILED DESCRIPTION OF THE PREFERRED EMBODIMENTS

Figure 1:
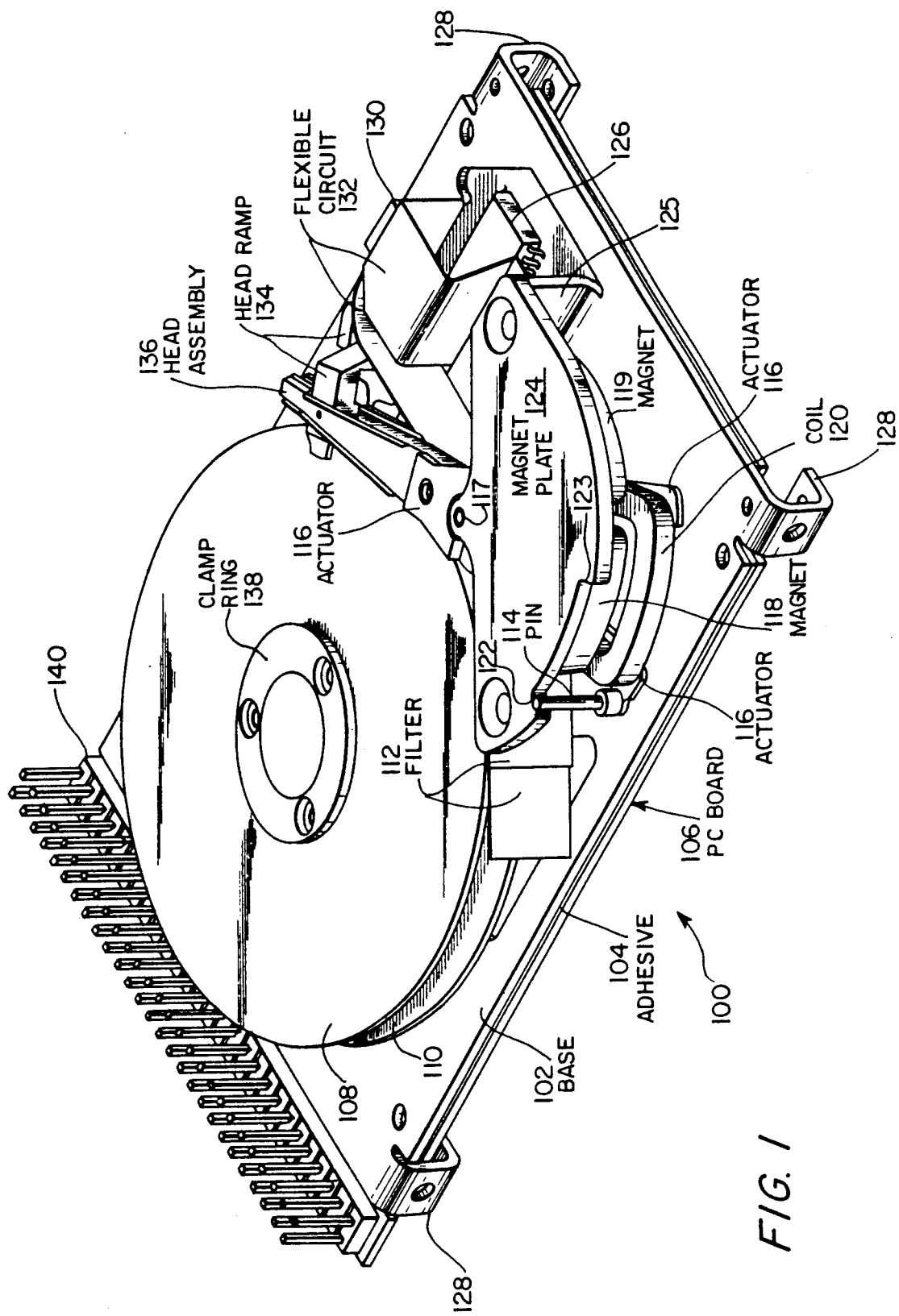
FIG. 1 is a perspective view of a preferred embodiment of the inventive disk drive apparatus, with the cover and gasket removed for ease of illustrating internal components.

In describing the preferred embodiments of the subject invention illustrated in the drawings, specific terminology will be employed for the sake of clarity. However, the invention is not intended to be limited to the specific terms so selected, and it is to be understood that each specific term includes all technical equivalents which operate in a similar manner to accomplish a similar purpose. Rather, the invention should be limited only in accordance with the appended claims, and their equivalents.

In addition such spatial terms as 'top', 'bottom', 'above', 'below', 'horizontal', 'vertical', 'front', 'rear', 'left' and 'right' are employed to provide an arbitrary frame of reference for ease of understanding the relative orientation of the elements of the preferred embodiment. Of course, the disk drive apparatus may function if it is physically oriented other than as particularly illustrated in the drawings and described in the text.

Referring now to FIG. 1, a preferred embodiment of the disk drive apparatus according to the present invention is illustrated. The apparatus is generally indicated as element 100.

The apparatus comprises a base 102 to which is adhered a circuit board, such as a printed circuit board 106, by means of a layer 104 material such as, preferably, adhesive. A first (top) disk 108 and a second (bottom) disk 110 comprises the hard magnetic storage medium according to the preferred embodiment. During operation, an air particle filter 112 traps particles through the use of a pressure differential created by rotating disks (which rotate counter-clockwise as seen from above in FIG. 1).

Figure 20:
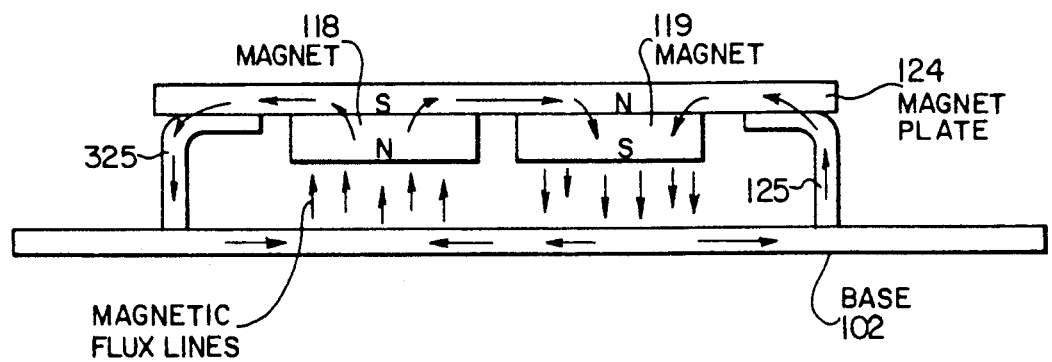
FIG. 20 illustrates the path of magnetic flux generated by permanent magnets for interaction with a coil for control of the head positioning actuator, in accordance with operation of the preferred embodiment.

A pin 114, preferably made of magnetically permeable metal, is attached to a rotary head positioning actuator 116. The pin provides a means by which the rotary actuator may be limited in the angle through which it traverses. Magnets 118 and 119 are attached to magnet plate 124, preferably made of magnetically permeable metal. The magnets serve as static permanent magnet elements of the actuator's "voice coil" motor, when acting in conjunction with moving coil 120. Magnet 118 and magnet 119 act together to create a uniform magnetic field in which the coil operates as illustrated in FIG. 20.

The magnet plate 124 with magnets 118 and 119 is stably mounted to the base 102 by means of a first flange 125, and by means of a second flange 325 (FIG. 3) which is not shown in FIG. 1 due to its being obscured behind air particle filter 112.

A circumferential recess in the magnet plate 124 is bounded by first and second pin stop surfaces 122 and 123. In the preferred embodiment, the head positioning actuator is rotary, so that it rotates about a pivot axis 117. As the actuator assembly rotates about pivot axis 117, motion of pin 114 is stopped by either of the surfaces 122 or 123.

One feature of the present invention is that, when the actuator rotates to or near either one of the extreme positions, magnetic forces cause the pin 114 to be magnetically attracted or "latched" to one or the other of the stop surfaces 122 or 123. If pin 114 is "latched" to surface 122, then the head assembly 136 is parked on head ramp 134. Conversely, if pin 114 is latched to stop surface 123, the head assembly 136 is positioned as close to the axis of the disks as possible. The magnetic latching feature finds special utility in drives which are as portable as the present preferred embodiment (see the small Form Factor in FIG. 2).

The magnetic latch (or magnetic actuator lock) feature works by creating a return path of greater permeance (lower reluctance, lower resistance to a magnetomotive force) than the magnetic circuit path of the voice coil motor for magnet 118 when the pin contacts or closely approaches either surface 122 or 123, as shown below in FIG. 21A. The path of greater permeance links the stop surface of the magnet plate to the stop pin, creating a magnetic force which "latches" the pin to the stop surface.

Rotary actuator 116 has attached to it a actuator coil 120. Current is passed through actuator coil 120, and, in conjunction with the magnetic fields from the magnets 118 and 119, provides the means of moving and controlling the position of head assembly 136. In operation, the head positioning actuator 116, including pin 114, actuator coil 120, and head assemblies 136, rotate about pivot axis 117 extending from the base 102 to the magnet plate 124. An actuator flexible circuit 132 (sometimes referred to as a "flex") provides electrical signal connection between the actuator 116 and the circuit board 106. The left-most portion of the actuator flexible circuit 132 is attached to the head positioning actuator and carries such signals as the read/write data from the heads as well as the connections to the coil 120. The flexible circuit element is physically supported by a flange 130 extending upward from the base 102, from where it folds over and downward over a portion of the circuit board containing an integrated circuit chip 126 and attaches to a connector (hidden from view in FIG. 1 by magnet plate 124, but shown in FIG. 1A as element 150).

A head ramp 134 provides a position for the read/write heads to rest in the "parked" position, the individual heads being separated from physical contact with one another and from the disks by ramp structures (FIGS. 17) of head ramp 134.

Also shown in FIG. 1 is a clamp ring 138 which attaches to the motor assembly, and tightly clamps the disks 108 and 110 in position. Also shown is a connector 140 for communicating or interfacing signals between circuit board 106 and external devices. Flanges such as 128 with threaded holes on their side and bottom surfaces allow the disk drive assembly 100 to be securely affixed within a computer or other cabinet.

Figure 1A:
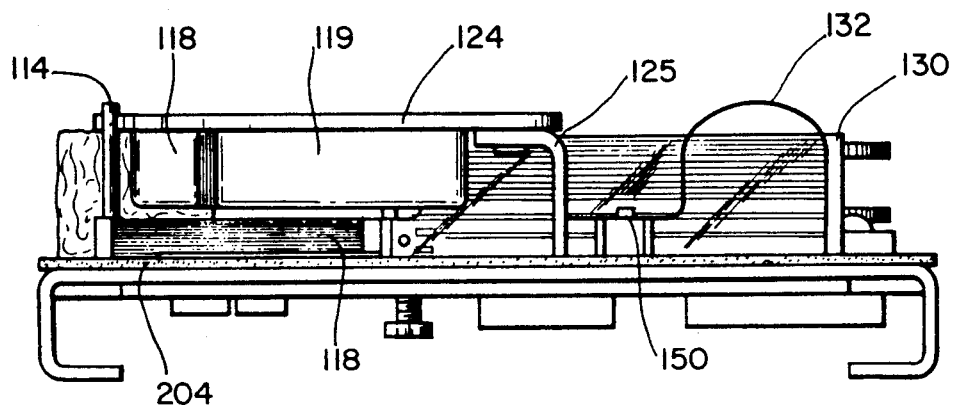
FIG. 1A is a side view of the embodiment shown in FIG. 1, as seen from the lower right of FIG. 1.

FIG. 1A illustrates the preferred embodiment of FIG. 1 in side view, as if seen from the lower right corner of FIG. 1. The components under magnet plate 120 can be more easily viewed.

More specifically, the attachment of magnets 118 and 119 to the lower surface of magnet plate 124 can be seen. Also, actuator coil is visible atop radial arms of the head positioning actuator (obscured by flexible circuit 132 and gasket 204). The multiple-folded nature shape of the flexible circuit 132, and its attachment to flange 130 and connector 150, are further illustrated. A twice-folded flange 125 (Also shown in FIG. 3, below) is one of two support structures for the magnet plate 124.

Figure 1B:
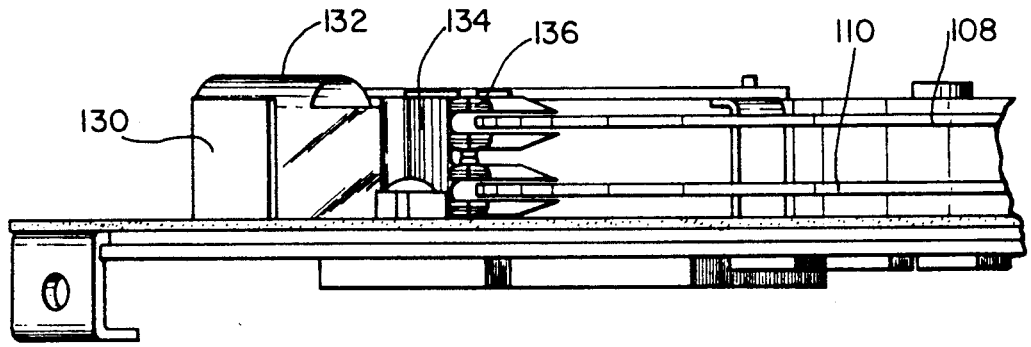
FIG. 1B is a side view of the embodiment shown in FIG. 1 with the head assembly 136 positioned substantially the same as in FIG. 1.
Figure 1C:
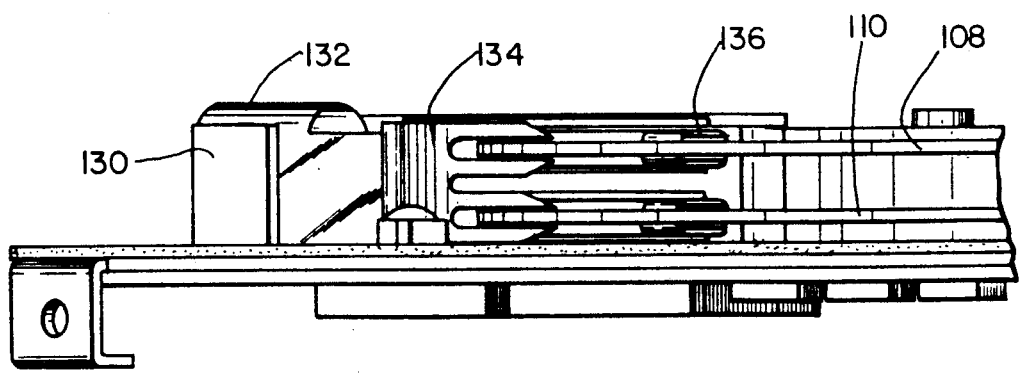
FIG. 1C is a side view of the embodiment shown in FIG. 1, with the head assembly 136 changed in position from FIG. 1 to rest off head ramp 134 and above the disks 108 and 110.

FIGS. 1B and 1C are side views of the preferred disk drive apparatus illustrated in FIG. 1, shown as if viewed from the upper right corner of FIG. 1. A comparison of FIGS. 1B and 1C illustrates the difference in the position of the heads on head assembly 136. The difference in positioning of the head assembly 136 is achieved by controllably rotating the positioning actuator 116 about its pivot 117.

As will be discussed in greater detail below, with respect to FIG. 17, head ramp 134 provides for separation of the heads from each other from the disks, when the head assembly 136 is at its outer "park" position (FIG. 1B). FIG. 1B is in contrast to FIG. 1C, in which is illustrated the close positioning of the heads to the disks 108 and 110 when the head assembly 136 is not in its outer "park" position. In FIG. 1C, the heads are illustrated riding on a cushion of air generated by the spinning disks 108 and 110, the cushion of air being on the order of 10 micro-inches. Clearly, there is less chance for damage to the disk or heads when the head assembly is positioned in the "park" position of FIG. 1B, especially when the drive is being physically transported.

FIG. 2 illustrates the disk drive apparatus according to a preferred embodiment of the present invention, with a cover 202 in place atop the base 102, separated therefrom by a gasket 204. Purposes of the gasket include minimization or elimination of minute particle entry into the interior of the disk drive, and minimization of transmission of shock, vibration, acoustic noise, and resonances of the cover 202 and base 102.

The form factor, or maximum physical dimensions in any one of the three Cartesian directions, can be very compact. For example, in one embodiment, the length L, width W and depth D are 4", 2.75" and 0.81", respectively. Within the form factor, the preferred embodiment can store up to 40 megabytes (MB) of data on the two disks 108 and 110 (FIG. 1). The disks according to the preferred embodiment have outer and inner diameters of 65 and 20 mm, respectively, and a thickness of 0.889 mm (0.035 inch). The disks may be obtained from a number of hard disk suppliers such as Komag, KME, or Denka, or may be built to specification.

The details of the components of the disk drive assembly shown in FIG. 1 and 2 are described below with special reference to the remaining figures.

FIG. 3 illustrates the substantially rectangular base 102 according to the preferred embodiment of the present invention, As described generally above, the base 102 provides physical support for many of the components of the disk drive apparatus.

Referring more specifically to FIG. 3, base 102 has four edges: front edge 330, rear edge 332, left edge 334, and right edge 336. Various threaded apertures are present for attaching the base to either the cover 202 (FIG. 2) or the circuit board 106 (FIG. 1). For example, threaded holes 304 near rear edge 332 are mated with screws which penetrate the circuit board, base and cover. Threaded holes 306 near the front edge 330 are mated with screws which bind the circuit board to the base, whereas threaded holes 308 even closer to the front edge 330 bind the base to the cover. Aperture 310, near the rear edge 332, provides space for upward projection of an integrated circuit on the circuit board and the base may be in close physical contact.

Aperture 312, located off-center on the base in the direction of the rear edge 332, is an opening and a guide for the axis of the motor assembly. Aperture 314, located adjacent the left edge 334, provides space for resistors and capacitors to protrude on the top of the circuit board 106.

Aperture 312, near the front edge 330 and right edge 336, allows physical space for integrated circuit chips on the circuit board to protrude on its top side. Part of the metal which would otherwise fill apertures 314 and 320 are dedicated to twice-bent flanges 325, 125, 130, which provide support for the magnet plate 124 and flexible circuit 132 (FIG. 1). Aperture 322 is a threaded aperture allowing secure attachment of the head ramp 134 (FIG. 1).

In the preferred embodiment, the base differs from the cast metal structure common in the art. Rather, the base, according to the preferred embodiment of the present invention, may comprise sheet metal which is punched and bent in the appropriate spots. This punched sheet metal construction allows greater economy of manufacture than cast metal plates known in the art, as well as providing the advantage of creating the return path for the magnets 118 and 119 used in the voice coil motor, thus eliminating an additional part that would be required if the base were made of a cast material such as aluminum.

Although the invention may be practiced with physical configurations other than those specifically described, the following measurements are provided as a particular exemplary embodiment. The base plate material may be 1008 or 1010 cold rolled steel, 0.05" thick ¼ hard minimum, with Rockwell hardness B60-B75. The finish may be electro-less nickel, 0.0002" through 0.0006" thick. The outside measurement of the length is 4", the outside measurement of the width is 2.75". Aperture 312 should be fitted with a fastener equivalent to Part No. SO-8143-8 from Penn Engineering & Manufacturing, Danboro, Pennsylvania. The fasteners should be installed in the base plate prior to any spot facing or plating. Aperture 318 should be fitted with a fastener equivalent to the Part No. FH-173-4. These features provide attachment for the motor and actuator bearing shaft to the base.

FIG. 4 is a perspective view illustrating the preferred damping layer, preferably a sheet of adhesive material, according to the present invention. As shown in FIG. 1, it is inserted between the base and the circuit board securely affixing the two together. Apertures 410, 412, 414, 418 and 420 correspond to apertures base 310, 312, 314, 318 and 320 (FIG. 3). In this manner, shafts or integrated circuits passing through apertures in the base 102 are not hindered by the presence of the adhesive layer 104.

In a preferred embodiment, the material comprising the adhesive layer may be either 4930 double-coated acrylic foam tape, 0.025" thick, or 9437 PC adhesive transfer tape, 0.010" thick, both available from Minnesota Mining & Manufacturing Co. (3M), Minneapolis, Minnesota. However, the advantages of the present invention may also be realized if the damping layer is not an adhesive material, but is merely a "constrained layer" of material, held in place by, for example, sets of screws directly binding the base to the circuit board.

The outside measurements of the preferred adhesive layers are 4" long by 2.75" wide, with a 0.26" notches cut out of the corners to allow for passage of the affixing screws through apertures such as 304 and 306.

The affixing of base 102 to stiff circuit board 106 reduces the acoustic noise generated by the spindle motor and the mechanical actuator on the base, as well as damping the mechanical resonances of the base. The adhesive joins the base and circuit board at a substantial portion of their entire surface areas, in contrast to known systems whose bases and circuit boards are joined by screws at a small number of discrete points.

According to the present invention, progressively greater areas of contact between the adhesive layer 104 and the base 102 and circuit board 106 provide progressively greater damping effect. Mere connection of a cast metal base to a circuit board by, for example, four screws at discrete locations without an intermediate damping layer (as would be taught by known systems) would provide an effective interconnection between the base and circuit board by approximately one percent of their surface areas. In contrast, greater contacting surface areas of damping layer 104 (preferably at least 75%, but also with contacting surface areas of 50% or even 25%) provides advantageous reduction of noise and vibration, and damping of component resonances. This increased damping is in accordance with the principles of constrained layer damping techniques. According to the present invention, any damping layer apertures 410, 412, 414, 418 and 420 should preferably be distributed substantially evenly about the area of the layer, so that the damping effects are correspondingly distributed. Concentration of apertures in one sector of the damping layer causes a disproportionately large loss of damping effect, as compared with a damping layer of the same contact area but with more evenly distributed apertures. This consideration of distribution of apertures may impact layout considerations in the design of the printed circuit board 106. According to the present invention, damping is substantially improved over known systems.

Figure 22A:
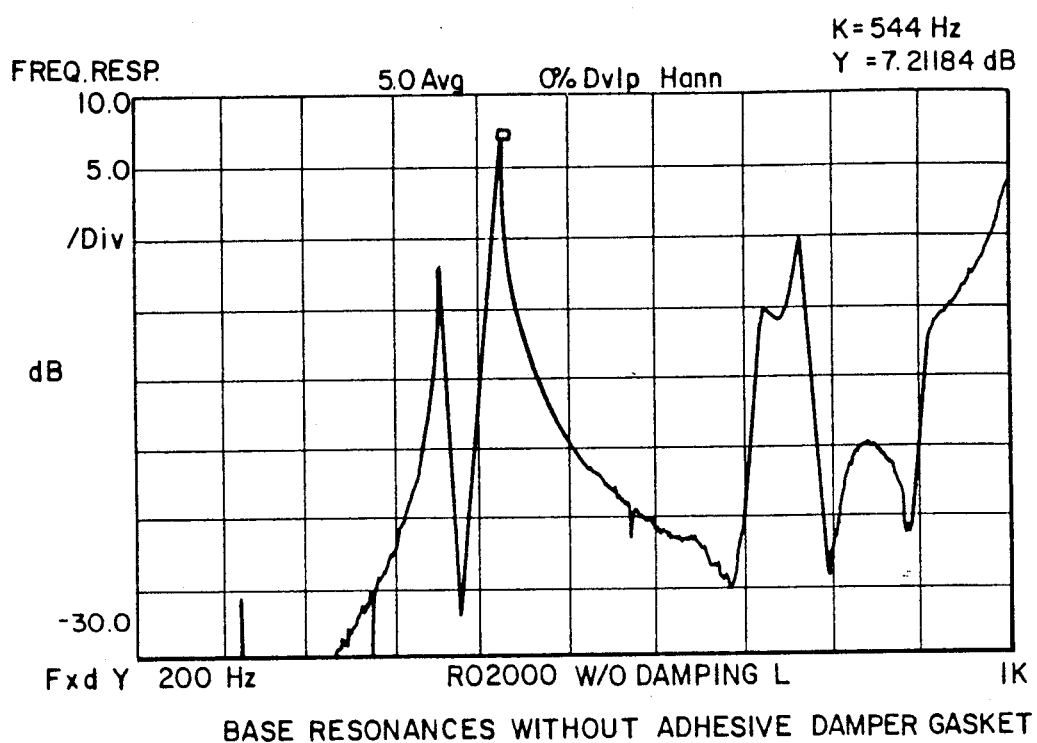
FIGS. 22A and 22B are actual measured frequency responses illustrating the approximately 13-17 dB damping of two base resonances (at approximately 485-500 Hz and 544-568 Hz) enabled by the damping feature of the preferred embodiment of the present invention.
Figure 22B:
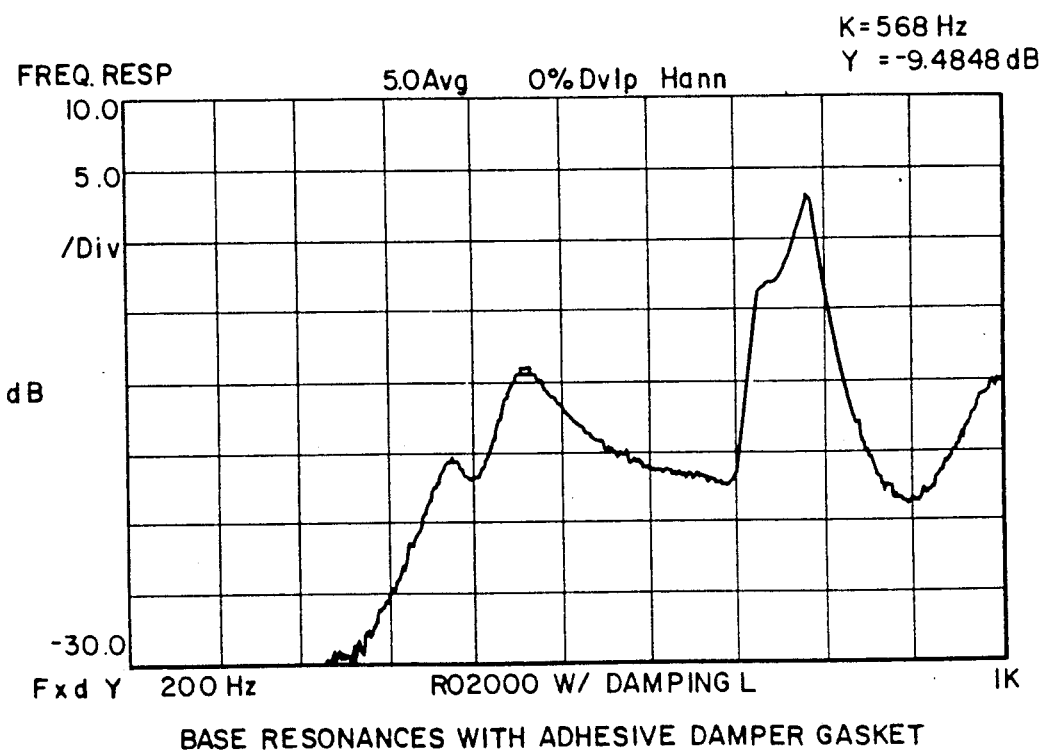

FIGS. 22A and 22B are actual measured frequency responses illustrating the approximately 13-17 dB damping of two base resonances (at approximately 485-500 Hz and 544-568 Hz) enabled by the damping feature of the preferred embodiment of the present invention.

FIG. 5 illustrates the circuit board, advantageously a printed circuit board 106 (FIG. 1). The circuit board 106 is affixed by the adhesive layer 104 to the sheet metal base 102. Although integrated circuits and condition pathways are present on both top and bottom surfaces of the circuit board, they are omitted from the illustration in FIG. 5 for purposes of clarity.

Apertures 512 and 518 are provided for clearance of the Penn Engineering fasteners which hold the spindle motor and actuator assembly shafts. Apertures 550 and 560 provide fixing points for the flexible circuit connector 150 (FIG. 1A). Apertures 504 and 506 provide for stability of attachment of the circuit board by means of threaded screws. Connector edge 140 is provided with two rows for insertion of connector pins, preferably on 0.1" separation distances. The outside dimensions of the board are 4.3"×2.75", with 0.27" notches cut in the ends opposite the connector, and 0.29" notches cut in the end of the board immediately adjacent the connector edge.

The material from which the printed circuit board is manufactured may be FR4 per mil standard 13939, with a total thickness of 0.062". No components should be placed on the top side of the circuit board except where openings are provided in the adhesive layer 104 and the base 102. In preferred embodiment, no component should be greater in height than 0.22", achievable with known "flat package" integrated circuits. The printed circuit foil may be manufactured using, any appropriate process known in the art to be desirable for disk drive applications. The electronic circuitry used in embodiments of the present invention may be any which allow the practice of, and the realization of the advantages of, the invention defined by the scope of the claims which follow. However, the following description of the electronics provides a background to those skilled in the art so that the electronic control of the here-in described physical elements may be facilitated.

The preferred disk drive electronics are designed to offer a range of features now becoming popular, in a choice of two interfaces, namely, SCSI and AT TM. All functions have been implemented in as few chips as possible, and an important feature of the design to minimize costs as far as is practical. They offer an all digital servo system, implemented in software in a digital signal processing (DSP) chip and capable of being customized via the interface processor's PROM. In addition, the electronics offer low power consumption and a range of power-save options, which can operate from a single 5 V power supply and can fit a 2.5" form factor drive to address the needs of lap-top systems.

The interface controller for the SCSI interface is the AIC 6110 from Adaptec Inc., run with a National HPC 46003-V17 micro-controller from National Semiconductor. For the AT TM bus interface, the controller is the Cirrus Logic SH-260, run with an Intel 80C32 micro-controller. In both cases, an external PROM or one-time-programmable (OTP) ROM holds firmware and drive configuration, with further configuration information stored on the disks. The buffer RAM consists of one or more 8-bit wide state RAM chips, and is bank switchable by the micro-controller. Power-save operating modes are used on both micro-controllers when the drive is idle, and the RAMs and ROMs are powered down by their enable pins. The micro-controllers also run the spindle via logic in a digital application specific integrated circuit and can support synchronized spindles. The spindle is based on a Hall-less design, with commutation effected by sensing motor back-EMF and speed controlled by pulse-width modulating the driving current. Motor back-EMF and capacitor discharge are available for automatically parking the heads when power is removed.

The interface controller chip handles the high speed sequences of interface protocol, buffer RAM management, sector format and error detection and correction. The only format header information used is a logical sector number. Disk defect management is implemented by erasure of the header field of the defective sector, and using the same header information in a sector in the spares area. There is one spare sector per megabyte of drive capacity.

The servo feedback information is written on the disks during manufacture, and is embedded on each track between the sectors on each head. The sectors are staggered from head to head around each cylinder so that an increase sample rate may be achieved by head switching during seek operations in order to improve velocity calculation. Each servo field includes a quadrature position pattern written as di-bits, and the cylinder number encoded in a Gray-code, and is radially continuous across a data-rate zone. There is a guard cylinder between data-rate zones. Servo information is always written at the same frequency regardless of which data-rate zone it is in. A unique pattern that cannot be generated by the Encoder/Decoder circuitry of the drive used to indicate the start of a servo field, and two index generation marks are included in each of the two servo fields from which an error-tolerant index pulse can be eventually created. A hardware timing circuit write protects the servo information and generates a sector pulse even if a servo field is missed.

A sample and hold circuit presents the sum and difference of the appropriate quadrature pulses to an analog-to-digital converter to be passed to a TMS-320C10 Digital Signal Processor (DSP). Acquisition timing may be controlled by a digital ASIC (an application specific integrated circuit capable of implementation by those skilled in the art). The DSP implements the seek, settle and track-follow transfer functions and algorithms. The coefficients for the transfer functions and other drive specific constants (e.g., data-rate zones) are passed from the interface micro-controller. The DSP output is fed from a digital-to-analog converter to a power amplifier of discrete bipolar transistors to drive the actuator. Both converters are contained in a single chip, the Analog Devices AD7569.

The data channel is essentially implemented in two chips. The signal from the read-write heads first passes through a preamplifier which has been developed specifically for 5 V (only) operation. The second chip is a National Semiconductor DP8467. This includes an AGC amplifier, pulse detector, data synchronizer, 1/7 code Encoder/Decoder (endec), multi-step write precompensation and a frequency synthesizer capable of generating a range of data rates. The endec is operated in hard sector mode.

Power save operations are selected by the drive's on-board processor when parts of this chip are not in use. The chip used for the servo sample and hold is used to select four levels of write current and to ensure that there is no write current through a head when the power supply is out of tolerance.

Returning to a discussion of the disk drive physical hardware, FIG. 6 is a perspective view of the preferred head positioning actuator 608 according to the present invention. Briefly, head positioning actuator 608 comprises a main body 602 from which extend first and second radially extending coil support arms 604 and 606, respectively. Also extending from the head positioning actuator, in a direction substantially opposite to the support arms 604 and 606, are three horizontal parallel planar members 620, 630 and 640. Appropriate surfaces of the planar members are attached to four suspensions of the read/write heads.

Figure 12:
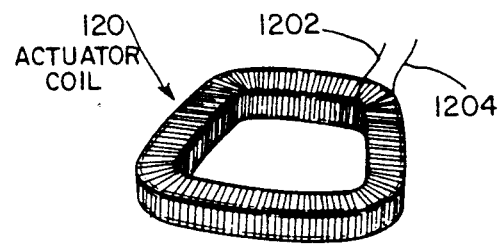
FIG. 12 is a perspective view of the actuator coil, which is part of the actuator motor function and permits electromagnetic control of the position of the head actuator assembly.

More specifically, coil support arms 604 and 606 support an actuator coil 120 such as that illustrated in FIGS. 1 and 12. The actuator coil fits in a position generally indicated as 608, situated outward from vertical surface 612 or the main body 602 and is attached to the actuator body with an adhesive such as a two part epoxy.

At the end of first coil support arm 604 is a circular aperture 614 for limiting pin 114 (FIGS. 1 and 7).

A curved vertical surface 610 on body 602 allows actuator flexible circuit structure 132 (FIGS. 1 and 13) to partially encircle the main body of the actuator, delivering signals between the actuator and elements external to it.

Planar members 620, 630 and 640 have respective circular apertures 621, 631, and 641 arranged vertically in-line for receiving cylindrical protrusion (swage rivet) on the suspensions which support the read/write heads. The head assembly extends in a direction generally indicated as 650. Four suspensions, corresponding to the four heads for reading and writing to the four surfaces of the two disks 108 and 110 (FIG. 1) are attached to the planar members 620, 630 and 640 in the following manner. A top suspension is affixed to the underside of the planar member 620; the second suspension is attached to the top portion of planar member 630. A third suspension is connected to the underside of planar member 630. Finally a fourth suspension is attached to the top side of the planar 640. Because the planar member 630 must support two arms, its thickness is greater than that of planar members 620 and 640. The head positioning actuator is advantageously manufactured from magnesium AZ91D.

In operation, the actuator coil is controllably energized by electric current, causing rotation of the actuator about a shaft assembly with in cylindrical aperture 617. Rotation of the head positioning actuator about its axis within 617 causes rotation of the head assembly extending from a direction 650 so as to controllably position the read/write heads at radial points on the various surfaces of the disks. A pin 114 extending from the cylindrical aperture 614 physically limits rotational motion of the actuator and head assembly to within a certain range, limited by contact edges 122 and 123 on the magnet plate 124 (FIGS. 1, 8 and 9). Advantageously, the head positioning actuator, read/write heads, and other attachments to the actuator, taken as a unit, may be properly balanced about the axis of rotation so as to facilitate control of the unit.

FIG. 7 illustrates the stop pin 114 according to the preferred embodiment. The stop pin 114 (as shown in FIG. 1, and referenced with respect to FIG. 6) is advantageously a cylinder of 400 series stainless steel or other material that is magnetically permeable. Although not necessary, stop pin 114 may be magnetized for enhancing the magnetic latching feature. Top end 702 may be magnetized to a "North" polarity; end 704 magnetized to "South" polarity, to function as in FIG. 21A.

FIG. 8 is a perspective view of the magnet plate 124 which was shown in FIG. 1 from a different angle. Magnet plate 124 comprises a top planar surface 806 and a bottom planar surface 808, parallel to each other. Apertures 802 and 804 are provided for receiving flat head screws to attach the magnet plate to the base 102 by its respective flanges 125 and 325 (FIG. 3). Aperture 817 is provided for pivoting of a vertically-oriented shaft assembly so that the head positioning actuator 116 (FIGS. 1 and 6) can rotate to controllably position the heads on the disks. Finally, contact surfaces 123 and 122 are provided to physically prevent rotation of the head positioning actuator beyond certain angular positions.

As will be described in greater detail below, when the head assembly is to be the parked position, the pin 114 (FIGS. 1 and 7) is latched to surface 122. In the preferred embodiment, the angle of rotation of the actuator assembly should be limited by the stop surfaces 122 and 123 to 44.38° (With a 1° tolerance). An inner radius 820 from the actuator rotation aperture 817 to the circumferential surfaces of the notch, is advantageously set at 0.863". The radius 822 to the outer circumference of the magnet plate 124 may comprise a material such as 1008 cold rolled steel or other material which is magnetically permeable.

FIG. 9 is a perspective view, from underneath, of a magnet assembly comprising the magnetic plate 124 and the two magnets 118 and 119, as described above, with respect to FIGS. 1 and 8. FIG. 9 illustrates the underside 808 of magnet plate 124, in contrast to the top surface 806 illustrated in FIG. 8. Securely affixed to the magnet plate 124 are the two magnets 118 and 119. Affixing may be accomplished using Loctite TM 325, or an equivalent adhesive. A bottom view of aperture 817 is illustrated, into which the shaft assembly of the head positioning actuator is inserted. Apertures 802 and 804, adapted to receive screws to affix the magnet assembly to the base, are also shown.

Magnets 118 and 119 may be formed from neodymium-iron-boron having the following properties:

$B_R$—11,600 G
$H_C$—10,800 $O^e$
$IH_C13$ 15,000 $O^e$
$(B. H)$ max—32 $MGO^e$

Surfaces may be coated with a white epoxy coating of 0.001" to 0.003" thickness. The magnets 118 and 119 may be magnetized as illustrated in FIGS. 9 and 20. In this example, a first end of magnet 118 is given a "south" polarity, with its opposite end given a "north" polarity. As will be appreciated by those skilled in the art, the magnets 118 and 119 interact with a properly energized actuator coil 120 (FIGS. 1, 12, and 19) to control the motion or position of the head positioning actuator 116. This interaction to control the head positioning actuator is described in greater detail below, with respect to FIG. 20.

The magnetized stop pin 114 provides a pathway for carrying magnetic flux lines, which pathway is enhanced when the pin is in contact with or physically close to either of the stop surfaces. The magnetic binding tendency to keep the pin in contact with the stop surfaces provides what is referred to herein as "latching" the actuator in place. Latching prevents wandering of the actuator, and therefore of the read/write heads, reducing the chance of damage to the heads and disks. With this physical and magnetic arrangement of the magnet, magnet plate, stop pin and stop surfaces, the position of the head positioning actuator when not affirmatively controlled by the actuator coil tends to "latch" to surface 122, the "park" position on the head assembly, or to surface 123, nearer the axis of the disks.

An advantage of this arrangement is that the head assembly and the actuator are held in a stable physical position, especially when heads are on the head ramp 134 (FIG. 1). This low-cost arrangement, requiring no excess power or extra moving parts such as the dedicated solenoids known in the art, functions as a magnetic latch, helping to prevent the heads from wandering across the disks unnecessarily.

Figure 10:
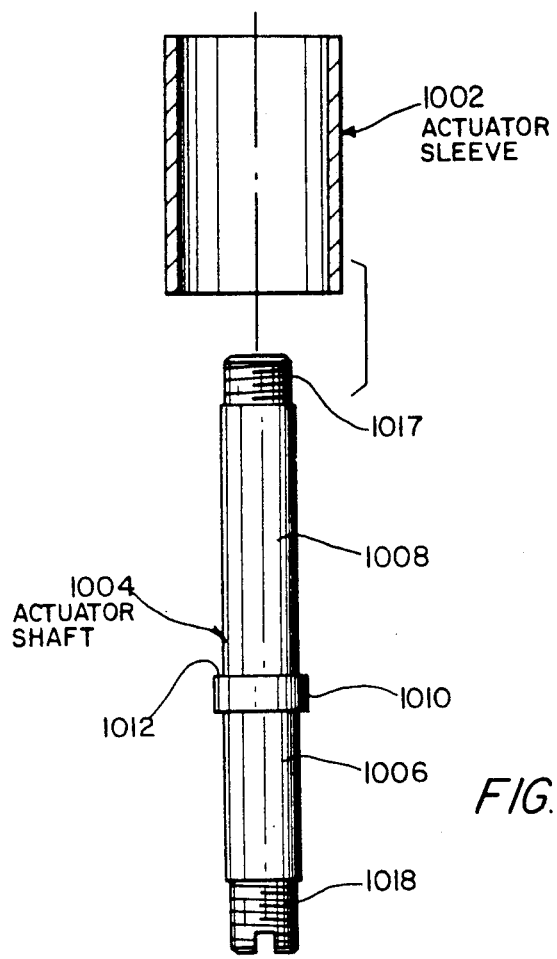
FIG. 10 illustrates the actuator sleeve and shaft.
Figure 11:
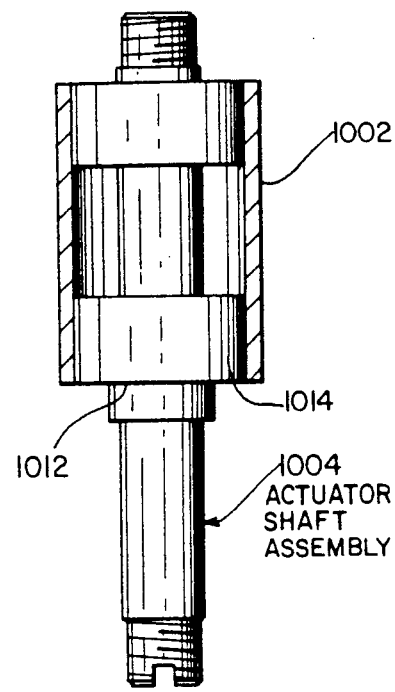
FIG. 11 illustrates the assembled shaft assembly which allows pivoting of the head positioning actuator.

FIGS. 10 and 11 show an actuator sleeve and shaft, and a shaft assembly, respectively. The shaft assembly allows a disk positioning actuator 116 with the head assembly 136 (FIG. 1) to rotate about an axis 117 around which the shaft assembly is centered.

Referring to FIG. 10, an actuator sleeve 1002 and an actuator and an actuator shaft 1004 are illustrated. The actuator sleeve 1002 is essentially a hollow cylinder which, in the preferred embodiment, is 0.335" in length, with 0.118" and 0.2275" inside and outside diameters, respectively.

The actuator shaft 1004 comprises an upper portion 1008 and a lower portion 1006, separated by an enlarged ring projection 1010. At the top of the upper shaft is a cylindrical projection 1017 for insertion into the aperture 817 of the magnet plate 124 (FIGS. 8 and 9). At the lower end of the shaft is a cylindrical structure 118 adapted to fit into an aperture 318 (FIG. 3) in the base 102 as well as through apertures 418 and 518 in adhesive layer 104 and circuit board 196.

FIG. 11 illustrates the sleeve and shaft components in assembled configuration.

Two bearings 1014, manufactured in accordance with considerations known to those skilled in the art, are attached to the shaft 1004 and the sleeve 1002 and are given a pre-load to remove any looseness in the bearings. The bearings allow the sleeve to rotate freely with respect to the shaft, which is stationary and rigidly attached to the base.

The bearing 1014 rests atop the enlarged ring portion on the surface 1012. The components shown in FIGS. 10 and 11 are advantageously manufactured from 300 series stainless steel with the exception of the bearings which are made from either 440 stainless steel or chromium steel.

In a preferred embodiment, the shaft 1004 is 0.77" in height; the upper cylindrical projection 1017 is 0.06" in length; the upper shaft structure 1008 is 0.355" in length; the ring structure 1010 is over 0.045" in length; the lower shaft structure 1006 is 0.22" in length; and the lower cylindrical projection 1018 is 0.09" in length. The outside diameter of the ring projection 1010 is 0.12".

FIG. 12 illustrates the actuator coil 120 (shown earlier in FIG. 1), adapted to rest atop coil support arms 604 and 606 of the head positioning actuator 116 (FIG. 6). The preferred embodiment of the actuator coil may be described as a piecewise-curved coil of wire. In the preferred embodiment, the depth D=0.765"; the width W=0.825"; the height H=0.1"; and the typical thickness of the coil T=0.12". A start wire 1202 and a finish wire 1204 represent the two ends of the wire comprising the coil. The start stop wires are connected to the actuator flexible circuit 132 (FIG. 1), receiving an electric current controlled by circuitry on printed circuit board 106 in accordance with the desired position of the magnetic field generated by the coil interfacing with the permanent magnets 118 and 119 to so position the actuator.

The coil wire is advantageously #34 AWG REA round aluminum wire with REABond ™ S thermamide bondable overcoat, with an acceptable resistance of 18 ohms at 20 °C. The coil winding should have 231 turns, with a tolerance of +/−1 turn.

Figure 13:
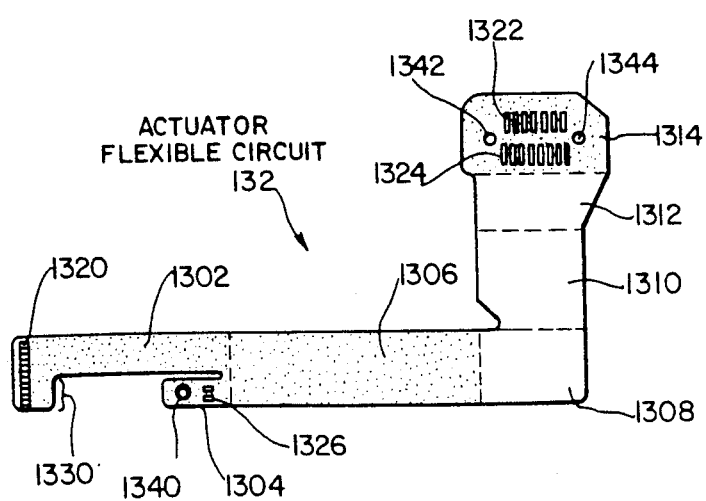
FIG. 13 is a view of a preferred actuator flexible circuit element which allows signal passage between the mobile head positioning actuator and the stationary circuit board.

FIG. 13 is a top plan view of the actuator flexible circuit 132, described briefly above with respect to FIG. 1. Briefly, in the preferred embodiment, the actuator flexible circuit may be conceived of as comprising seven sections shown as element 1302, 1304, 1306, 1308, 1310, 1321 and 1314. First and second sections 1302 and 1304 attach to the movable actuator, whereas the seventh section 1314 attaches to the stationary circuit board. Dotted lines between sections in FIG. 13 illustrate the points at which the flexible circuit material is folded. The actuator flexible circuit provides paths to signals traveling between and among pads 1320 and 1326, and the actuator coil (at the actuator end), and pads 1322 and 1324 (at the circuit board end).

Referring more specifically to FIG. 13, the first section 1302 is adapted to wrap around the vertical surface 610 (FIG. 6) of the actuator 116. Pads 1320 are connected to respective conductors in the actuator, and carry signals to and from the head assembly. The portion 1330 of the first section 1302 extends beneath the vertical portion 610 of the actuator, so as to provide an increased width of the flexible circuit for transmitting more signals.

At corresponding site on the vertical face of the actuator 602, the second section 1304 of the actuator flexible circuit is attached at 1340. Signals pass through pads 1326. The third section 1306 extends from the actuator body 602 along a curved and flexible path to flange 130 (FIG. 1). The fourth section 1308 attaches to the flange 133 (FIG. 1). he fifth section 1310 is horizontally situated, with the sixth section 1312 being bent so as to be vertically oriented, approaching the base 102, as shown in FIG. 1. Finally, the seventh section 1314 of the actuator Flexible circuit is attached to a connector extending from the circuit board, being attached thereto at 1342 and 1344.

This arrangement allows continuous communication of signals between the stationary circuit board 106 and the heads via non- stationary (rotationally movable) actuator.

Advantageously, the base material for the actuator flexible circuit may be polyamide-imide (Kapton ™) of 0.001" thickness. Segments 1302, 1304 and 1306 should have high resistance to flexural fatigue. The conductors, advantageously rolled annealed copper (1 oz/sq. ft) should be sandwiched between two layers of the base material. The first section 1302 may be advantageously adhered to the actuator main body by means of pressure-sensitive adhesive, such as 3M-950 of 0.005" thickness, or an equivalent thereof.

In the embodiment, the different sections have the following measurements (in inches):
1302 : 1.02×0.33 (1330=0.12×0.187)
1304 : 0.292×0.12
1306 : 1.207×0.33
1308 : 0.5×0.33
1310 : 0.5×0.46
1312 : 0.5 (or 0.693 for wider portion)×0.27
1314 : 0.693×0.75

FIG. 14 illustrates the preferred embodiments of the cover 202 and gasket 204 described above, with respect to FIG. 2. Cover 202 comprises apertures 1404 and 1408. Gasket 204 comprises corresponding apertures 1424 and 1428. These sets of apertures allow attachment of cover 202 to base 102 (FIG. 3) at threaded apertures 304 and 308. The gasket 204 is squeezed between the cover 202 and the base 102 so as to exclude air and dust from the interior of the disk drive apparatus, and to provide further reduction of vibration and acoustic noise or the damping of resonances of the base and cover.

The cover 202 may advantageously comprise aluminum 5052 of 0.025" thickness. The gasket 204 may advantageously comprise porion cellular urethane which is acrylic-supported, as Part No. 701-09-25045-1648-IPSA, available for Betham Corporation of Middlesex, New Jersey. The porion cellular urethane may be general purpose, low-modulus, urethane, of density 25 lbs/cubic ft, of thickness 0.045". The undersurface of the gasket may advantageously have pressure-sensitive tape so as to attach it to the surface of the base in a manner corresponding to the lower surface of the cover 202 when it is in position.

FIG. 15 illustrates the air particle filter 112 shown above, in FIG. 1. The filter assembly 112 comprises a filter patch 1502 and an adhesive patch 1504 partially overlapping it. The overall assembly in the preferred embodiment is 0.75" wide by 0.40" high with a 0.05" notch in the top of the adhesive patch 1504 to allow fitting the adhesive patch under the horizontal portion of flange 325 on the base (FIG. 3). The width of the preferred adhesive is 0.375".

The filter 1502 should have a filtering efficiency of 90% minimum, using 0.3 micron particle size in ambient air. Of course, because the purpose of the filter is to restrain any particles from reaching the spinning disks 108 and 110 (FIG. 1), the filter should be kept clean prior to attachment and covering with the cover 202 and gasket 204 (FIG. 14).

FIG. 16 illustrates the clamp ring 138, a disk spacer 1602 and a disk drive motor hub 1604 in an exploded view, with the disks 108 and 110 omitted for visual clarity of the mechanical components.

Motor hub 1604 comprises a series of concentric, cylinder-shaped surfaces of progressively smaller radius. A first cylindrical surface 1606 ends at a disk-shaped horizontal surface 1608. A second cylindrical surface 1610 ends in a horizontal disk-shaped surface 1612. Finally, a third cylindrical surface 1614 ends in a disk-shaped top surface 1616.

The lower disk rests atop surface 1608. The disk spacer 1602 sits atop the lower disk 110, being closely aligned with the cylindrically-shaped surface 1610. The top disk 108 rests atop the installed disk spacer 1602. Finally, clamp ring 138 (also shown in FIG. 1) is affixed to the motor hub 1604 by screws inserted through apertures 1631, 1632 and 1633 into threaded receiving apertures 1621, 1622 and 1623 on the surface 1612 of the motor hub 1604.

In operation, the motor hub (with exception of the fixed shaft 1618), disk spacer, and clamp ring components visible in FIG. 16 rotate with the disks 108 and 110 clamp there between, controlled by the motor contained within the motor hub 1604. FIG. 19, described below, describes a bottom perspective view of the motor hub.

The motor may be any chosen by those skilled in the art for a particular application, such as those available from Tokyo Electric Corporation, Nidec, or Kubota Microdyne.

Cylindrically-shaped structure 1606 is 0.105" long and 0.88" diameter. Cylindrical surface 1610 is 0.22" long and 0.787" in diameter. Cylindrical surface 1614 is 0.085" long and 0.48" in diameter. The disk spacer 1602 according to the preferred embodiment is a cylinder having a length 0.61", inside diameter 0.789" and an outside diameter 0.88". It is advantageously manufactured of aluminum 6061-T6 or 6061-T6511. The preferred clamp ring 138 is 0.62" in depth, having an inside diameter of 0.5" and an outside diameter of 0.88".

FIG. 17 illustrates the preferred head ramp 134, described briefly above, with respect to FIG. 1. Head ramp 134 comprises a horizontal portion 1702 and a vertical portion 1704.

Horizontal portion 1702 comprises a curved arm 1708 which forms an inlet 1706 which is adapted to receive an affixing means such as screw to firmly attach the head ramp to the base at aperture 322 (FIG. 3).

Vertical portion 1704 comprises an upper structure 1710 and a lower structure 171720, each corresponding to a head for reading and writing to respective disks 108 and 110 (FIG. 1). Upper structure 1710 comprises upper and lower horizontal planar members 1712 and 1714. Similarly, lower structure 1710 comprises upper and lower horizontal planar members 1722 and 1724. Planar members 1712, 1714, 1722 and 1724 terminate in primary ramp surfaces 1716, 1718, 1726 and 1728, respectively, inclined with respect to the horizontal.

Primary ramp surfaces 1716 and 1726 are on the top surfaces of planar members 1712 and 1722, respectively, whereas primary ramp surfaces 1718 an 1728 are on the bottom surfaces of the planar members 1714 and 1724, respectively. Each of the primary ramp surfaces 1716, 1718, 1726 an d 1728 are laterally terminated by secondary ramp surfaces such as that indicated as element 1730, the other seven secondary ramp surfaces not being specifically labeled for propose of graphic clarity. In this manner, planar members 1712, 1714, 1722 and 1724 present a narrowing ramp surface to the respective read/write heads on the head assembly 136 (FIG. 1).

As heads approach the ramp surfaces 1716, 1718, 1726 and 1728 by action of head positioning actuator 116 (FIGS. 1 and 6), the heads are lifted away from the respective disks 108 and 110. In the preferred embodiment, disks 108 and 110 are actually situated in the openings 1740 and 1742, respectively, between the planar members, during operation. As the read/write heads approach the head ramp 134 to assume the park position, they are lifted away from the disks before reaching the edge of the respective disks.

In the preferred embodiment, the head ramp 134 is manufactured from Torlon TM 4347, or an equivalent plastic or other suitable material. Planar members are preferably 0.030" thick, terminating in ramp surfaces 0.09" long, coming to a point at the end of the planar member, thus determining the angle of inclination with respect to the horizontal. Viewed from above, the secondary ramp surfaces such as 1730 are angled at 24° from the parallel vertical sides of the planar members. Spaces 1740 and 1742 are 0.07", whereas the space between planar members 1714 and 1722 is 0.08".

The preferred head load/unload process at power-up and power-down may be described as follows. At drive power-up, the heads, having been parked on the ramp at the previous power-down, remain on the ramp while the motor spins the disks up to speed. After the disks are running at the correct speed, the heads are loaded on to the disk using the voice coil motor of the actuator to supply the force required. Then the drive is ready to read and write.

There are two levels of 'power-save' that are automatically invoked based on a programmable timer. (Power-save is used to conserve battery power and thus battery life.) In the first level of power-save, the actuator is parked on the ramps, again using the voice coil motor to provide the parking force. Then the electronics for the read/write circuitry, the servo circuitry and other supporting circuits are turned off to conserve power. The motor remains spinning and the interface remains active awaiting a command which would take the drive out of the level 1 power-save mode and make it again active. If no command to reactivate the drive is issued within a programmable length of time, the drive enters the second level of power-save. In level 2 power-save the drive motor is shut down and all remaining circuit with the exception of the interface circuits are turned off. The interface remains active awaiting a command that would take the drive into an active mode once again.

If power to the drive is suddenly removed while the drive is active, circuits on the PC board 106 short the rectified back-EMF of the spindle motor to the actuator voice coil motor providing the energy to drive the heads up the ramp and park them. This is called an 'emergency retract' condition.

FIG. 18 is partially-exploded bottom perspective view of the preferred disk drive apparatus shown in FIG. 1. In more detail, the preferred cover 202 is shown to have a substantially hollow interior 1802 adapted to contain the components shown atop the base 102 in FIG. 1. The edge of gasket 204 is also visible in FIG. 18, and is adapted to allow firm sealing of the space between the cover 202 and the base 102 during operation.

Furthermore, exemplary preferred integrated circuits such as elements 1804, are visible on the underside of circuit board 106. As described elsewhere in this specification, the preferred circuit board 106 is printed circuit board having integrated circuit elements on both sides, so as to minimize the overall space occupied by the physical elements. For example, integrated circuit chip 126 (FIG. 1) is on top surface of the circuit board 106, whereas integrated circuits 1804 are on its lower surface. In this manner, the circuitry necessary to operate the disk drive may be optimized to both occupy a small amount of ("horizontal") area on the circuit board, and occupy a small ("vertical") space above and below the circuit board itself. As described above, the placement of mechanical components on the base 102 substantially impacts choice of possible sites for chips on the top surface of the circuit board.

FIG. 19 is a bottom perspective view of the motor hub illustrated from above in FIG. 16. In the preferred embodiment, a fixed shaft 1902 extends axially through and downward from the bottom 1904 of rotatable motor hub 1604 to penetrate the apertures 312 on base 102 (FIG. 3), aperture 412 on adhesive layer 104 (FIG. 4) and aperture 512 on circuit board 106 (FIG. 5). In the preferred embodiment, the shaft extends 0.25" beneath the body of the motor, with a 0.02" enlarged cylindrically-shaped structure 1906 disposed between the main body and the shaft.

The disks 108 and 110, and head assembly 136, may be chosen in accordance with principles and specifications known to those skilled in the art, and need not be discussed in further detail here.

FIG. 20 illustrates the path of magnetic flux generated by permanent magnets for interaction with a coil for control of the head positioning actuator, in accordance with operation of the preferred embodiment. FIGS. 21A and 21B illustrate the path of magnetic flux generated by permanent magnets through the magnet plate, stop pin, and base, so as to demonstrate the functioning of the preferred embodiment of the magnetic actuator lock (or "latch") according to the present invention. It is a primary advantage of the present invention that the "voice coil" motor magnets which provide magnetic flux for interacting with the actuator coil for positioning the actuator during operation, also provide magnetic flux for the magnetic latching arrangement.

Referring to FIG. 20, magnetic flux lines generated by magnet 118 are shown extending from its upper (south magnetized) end through magnet plate 124 through either support flange 325 or through the other magnet 119. Flux lines return to the lower (north magnetized) end of magnet 118 through base 102. Conversely, magnetic flux lines generated by magnet 119 are shown extending from its bottom (south-magnetized) end through the air partially occupied by the actuator coil (not explicitly shown) to base 102. Flux lines return to the upper (north-magnetized) end of magnet 119 through either support flange 125 or magnet 118, and finally through magnet plate 124.

In accordance with general electromagnetic principles known to those skilled in the art, the actuator coil, disposed in operation between the magnets and the base, responds to the characteristics of the current passing through it by being laterally displaced. The lateral displacement of the actuator coil translates to rotational motion of the head positioning actuator, and placement of the read/write heads with respect to the disks. In this manner, the current passing through the actuator coil may be considered an independent variable which effectively controls the position of the read/write heads, through at least the instrumentality of the permanent magnets.

Figure 21A:
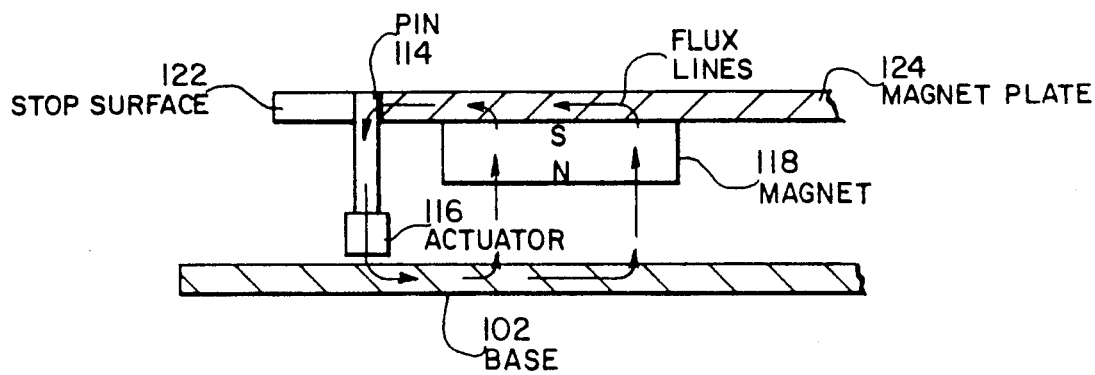
FIGS. 21A and 21B illustrate the path of magnetic flux generated by permanent magnets through the magnet plate, stop pin, and base, so as to demonstrate the functioning of the preferred embodiment of the magnetic actuator lock (or "latch") according to the present invention.
Figure 21B:
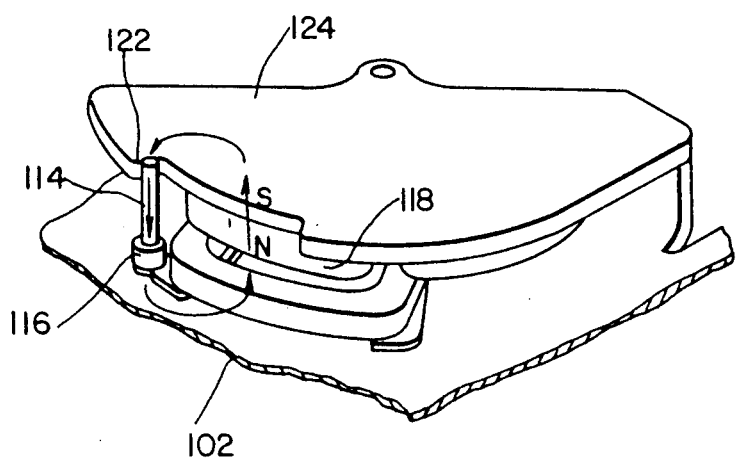

Referring now to FIGS. 21A and 21B, the magnetic flux paths used in the magnetic latching feature are illustrated in side and top perspective views, respectively. Flux lines are illustrated emanating from the top (south-magnetized) end of magnet 118 through magnet plate 124 to its stop surface 122. When the stop pin 114 is contacting, or is physically near, stop surface 122, the stop pin serves as a low-reluctance pathway for the flux lines to pass through to the base 102 and back to the lower (north-magnetized) end of magnet 118.

With this arrangement, when the head positioning actuator 116 is positioned so that the stop pin 114 is contacting, or is physically close to, stop surface 122, the enhanced reluctance achieved by this relative positioning generates an effectively attractive force between the stop surface and the stop pin. In this manner, the stop pin 114 (and the head positioning actuator to which it is connected) is "latched" into position against stop surface 122.

This attractive force is substantially dependent on the physical arrangement of the components, the magnetic properties of the flux-carrying elements, and the relative position of the stop pin to the stop surface. This attractive force is present even if the disk drive is powered down, as the source of the attractive energy is the magnetic flux emanating from the permanent magnet 118.

The above-described magnetic latch principles may be applied to latch the stop pin 114 against another stop surface, such as stop surface 123 (FIG. 1). Furthermore, the attractive force of the latch mechanism may be supplemented by providing a stop pin which is magnetized, so that it is attracted to the stop surface. Generally, the latching mechanism is effective when the stop pin is in contact with, or physically close to, a stop surface, and the position of the head positioning actuator is not otherwise affirmatively controlled so as to overpower the latching tendency. In this manner, the magnetic latching mechanism finds special utility in maintaining the read/write heads in a park position when the disk drive apparatus is powered down, protecting the heads and disks from damage.

It is apparent that many modifications and variations of the above-described embodiments of the present invention are possible in light of the above teachings. It is therefore to be understood that, within the scope of the appended claims and their equivalents, the invention may be practiced otherwise than specifically described.

What is claimed is:

1. A disk drive apparatus, comprising:
   at least one disk for storage of information;
   a head assembly including at least one head for reading or writing information to the at least one disk;
   a head positioning actuator for positioning the at least one head at a given position with respect to the at least one disk;
   a magnet assembly including at least one magnet and at least one magnet assembly stop surface; and
   an actuator coil, operatively connected with the actuator and physically positioned with respect to the at least one magnet for carrying controlled currents for generating magnetic fields for interaction with at least one magnet in the magnet assembly so as to control the actuator's position and at least one head;
   wherein the head positioning actuator includes an actuator stop surface, the actuator stop surface comprising a low reluctance pathway for magnetic flux when contacting or physically close to the at least one magnet assembly stop surface; and
   wherein conduction of magnetic flux from the magnet assembly through the low reluctance pathway of the actuator stop surface and back to the magnet assembly causes a magnetic force to be applied to the actuator stop surface in the direction of the magnet assembly stop surface.

2. The apparatus of claim 1, wherein:
   the magnetic force consists essentially of magnetic force generated only by the magnet assembly which interacts with the magnetic fields generated by the actuator coil to control the actuator's position.

3. An assembly for use in a disk drive apparatus, for applying force to maintain at least one head in a desired position when the head is not otherwise controlled, the assembly compromising:
   a head positioning actuator for positioning the at least one head at a given position with respect to at least one disk:
   a magnet assembly, the magnet assembly including at least one magnet and at least one magnet assembly stop surface; and
   an actuator coil, operatively connected with the actuator and physically positioned with respect to the at least one magnet, for carrying controlled currents for generating magnetic fields for interaction with the magnet assembly so as to control the position of the actuator and the at least one head;
   wherein the head positioning actuator includes an actuator stop surface, the actuator stop surface comprising a low reluctance pathway for magnetic flux when contacting or physically close to the at least one magnet assembly stop surface; and
   wherein conduction of magnetic flux from the magnet assembly through the low reluctance pathway of the actuator stop surface and back to the magnet assembly causes a magnetic force to be applied to the actuator stop surface in the direction of the magnet assembly stop surface.

4. The assembly of claim 3, wherein:
   the magnetic force consists essentially of magnetic force generated only by the magnet assembly which interacts with the magnetic fields generated by the actuator coil to control the actuator's position.

5. A disk drive apparatus, comprising:
   means for storing information;
   means for writing information to, or reading information from, said means for storing;
   an actuator structure for positioning the means for writing or reading, the actuator structure including a first stop means; and
   means for latching the actuator structure in one or more predetermined positions, the means for latching including a second stop means and a magnetic means for holding together the first and second stop means, the magnetic means consisting essentially of one or more magnets which are used in affirmatively positioning the actuator structure during operations such as reading or writing.

6. The apparatus of claim 5, wherein the means for writing or reading includes a head assembly connected to the actuator structure; and
   wherein the position of the first stop means changes when the position of the means for writing or reading changes.

7. The apparatus of claim 6, wherein the actuator structure is a rotary actuator which includes a pivot, and the means for writing or reading includes a head assembly connected to the actuator structure at a side of the pivot opposite to that of the first stop means so that the position of the first stop means changes when the position of the means for writing or reading changes.

8. The apparatus of claim 6, wherein the magnetic means includes a magnet, and the first and second stop means comprise a low reluctance pathway for magnetic flux when they are contacting or physically close to each other, wherein the conduction of magnetic flux through the first and second stop means causes a magnetic force to be applied to the first stop means in the direction of the second stop means so as to maintain the first stop means against the second stop means.

9. The apparatus of claim 8, wherein the first stop means includes a stop surface, and the second stop means includes a stop surface formed from an edge of the magnetic means.

10. The apparatus of claim 9, wherein the stop surface is magnetized.

11. The apparatus of claim 9, wherein the apparatus includes one first stop means and two second stop means, at least one of the second stop means corresponding to a park position of the writing or reading means.

12. The apparatus of claim 11, wherein:
the means for writing or reading includes at least one head; and
the disk drive apparatus further comprises a head separator structure for physically separating the at least one head from the means for storing when the writing or reading means approaches the park position, and for allowing the at least one head to gradually physically approach the means for storing as the writing or reading means leaves the park position, wherein possibility of damage to the at least one head or the means for storing is reduced.

13. The apparatus of claim 12, wherein the head separator structure includes at least one ramp surface arranged substantially perpendicular to a direction of motion of the writing or reading means, the writing or reading means physically moving on the ramp in a first direction so as to physically separate the at least one head from the means for storing, and moving on the ramp in a second direction so as to allow the head to gradually physically approach the means storing.

14. The apparatus of claim 5, wherein:
the first stop means is a first stop surface which comprises a portion of the actuator structure and which moves with it.

15. An assembly for a disk drive apparatus, for applying a magnetic force to maintain at least one head in a desired position when the head is not otherwise controlled, the assembly comprising:
means for writing information to, or reading information from, a means for storing information, the means for writing or reading including the at least one head;
an actuator structure for positioning the means for writing or reading, the actuator structure including a first stop means; and
means for latching the actuator structure in one or more predetermined positions, the means for latching including a second stop means and a magnetic means for holding together the first and second stop means, the magnetic means consisting essentially of one or more magnets which are used in affirmatively positioning the actuator structure during operations such as reading or writing.

16. The assembly of claim 15, wherein the means for writing or reading includes a head assembly connected to the actuator structure so that the position of the first stop means changes when the position of the means for writing or reading changes.

17. The assembly of claim 16, wherein the actuator structure includes a pivot, and the means for writing ore reading includes a head assembly connected to the actuator structure at a side of the pivot opposite to that of the first stop means so that the position of the first stop means changes when the position of the means for writing or reading changes.

18. The assembly of claim 16, wherein the magnetic means includes a magnet, and the first and second stop means comprise a low reluctance pathway for magnetic flux when they are contacting of physically close to each other, wherein conduction of magnetic flux through the first and second stop means causes a magnetic force to be applied to the first stop means in the direction of the second stop means so as to maintain the first stop means against the second stop means.

19. The assembly of claim 18, wherein the first stop means includes a stop surface, and the second stop means includes a stop surface formed from an edge of the magnetic means.

20. The assembly of claim 19, wherein the stop surface is magnetized.

21. The assembly of claim 19, wherein the assembly includes one first stop means and two second stop means, at least one of the second stop means corresponding to a park position of the writing or reading means.

22. The assembly of claim 21, wherein:
the means for writing or reading includes at least one head; and
the assembly further comprises a head separator structure for physically separating the at least one head from the means for storing when the writing or reading means approaches the park position, and for allowing the at least one head to gradually physically approach the means for storing as the writing or reading means leaves the park position, wherein possibility of damage to the at least one head of the means for writing or reading is reduced.

23. The assembly of claim 19, wherein the head separator structure includes at least one ramp surface arranged substantially perpendicular to a direction of motion of the writing or reading means, the writing or reading means physically moving on the ramp in a first direction so as to physically separate the at least one head from the means for storing, and moving on the ramp in a second direction so as to allow the head to gradually physically approach the means for storing.

24. The assembly of claim 15, wherein:
the first stop means is a first stop surface which comprises a portion of the actuator structure and which moves with it.

* * * * *